(12) United States Patent
Sato et al.

(10) Patent No.: US 7,927,243 B2
(45) Date of Patent: Apr. 19, 2011

(54) TRANSMISSION BELT

(75) Inventors: Yoshitaka Sato, Nara (JP); Masami Sato, Nara (JP); Tsutomu Tokunaga, Nara (JP); Satoshi Furukawa, Nara (JP)

(73) Assignee: The Gates Corporation, Denver, CO (US)

( * ) Notice: Subject to any disclaimer, the term of this patent is extended or adjusted under 35 U.S.C. 154(b) by 1065 days.

(21) Appl. No.: 10/523,708

(22) PCT Filed: Aug. 8, 2003

(86) PCT No.: PCT/JP03/10167
§ 371 (c)(1), (2), (4) Date: Sep. 6, 2005

(87) PCT Pub. No.: WO2004/015300
PCT Pub. Date: Feb. 19, 2004

(65) Prior Publication Data
US 2006/0105873 A1 May 18, 2006

(30) Foreign Application Priority Data

Aug. 8, 2002 (JP) .................. P2002-230911
Jun. 2, 2003 (JP) .................. P2003-156499

(51) Int. Cl.
*F16G 1/00* (2006.01)
*F16G 5/16* (2006.01)
(52) U.S. Cl. ...................... 474/263; 474/242
(58) Field of Classification Search ............... 474/237, 474/238, 242, 263, 265, 271, 268, 468
See application file for complete search history.

(56) References Cited

U.S. PATENT DOCUMENTS

| 4,127,039 | A | | 11/1978 | Hollaway, Jr. ............... 74/232 |
| 4,177,688 | A | | 12/1979 | Howerton et al. ............ 74/233 |
| 4,305,714 | A | * | 12/1981 | Renshaw ................... 474/250 |
| 5,492,507 | A | * | 2/1996 | Kumazaki ................. 474/205 |
| 5,674,143 | A | * | 10/1997 | Kumazaki et al. .......... 474/263 |
| 5,860,883 | A | | 1/1999 | Jonen et al. |
| 5,891,561 | A | * | 4/1999 | Kinoshita et al. ........ 428/295.1 |
| 5,908,520 | A | * | 6/1999 | Kodama .................... 152/527 |
| 6,358,171 | B1 | * | 3/2002 | Whitfield ................. 474/266 |
| 6,626,784 | B1 | * | 9/2003 | Sedlacek .................. 474/261 |
| 2001/0039226 | A1 | * | 11/2001 | Ito ........................ 474/263 |
| 2003/0130077 | A1 | * | 7/2003 | Knutson ................... 474/260 |
| 2003/0171181 | A1 | * | 9/2003 | Sedlacek .................. 474/263 |

FOREIGN PATENT DOCUMENTS

| EP | 622563 A | 11/1994 |
| EP | 0 694 710 B1 | 10/1998 |
| GB | 2 351 336 A | 12/2000 |
| JP | 2000-002300 | 6/1998 |
| JP | 2000-002302 | 6/1998 |
| JP | 2000-336539 | 5/1999 |

* cited by examiner

*Primary Examiner* — James Pilkington
(74) *Attorney, Agent, or Firm* — Paul N. Dunlap, Esq.; Jeffrey A. Thurnau, Esq.; Thomas A. Dougherty, Esq.

(57) ABSTRACT

A stock rubber is provided with chopped aramid fibers and chopped polyester fibers blended in the rubber component, which is EPDM. The chopped polyester fibers are longer than the chopped aramid fibers. A transmission V-belt is obtained and molded from the stock rubber. When molding, the chopped aramid fibers and the chopped polyester fibers are oriented in a width direction of a belt body of the V-belt.

13 Claims, 13 Drawing Sheets

TRANSMISSION BELT

TECHNICAL FIELD

The present invention relates to a transmission belt which is used for transmitting rotational force in a transmission of a scooter etc.

BACKGROUND ART

Conventionally, a transmission V-belt in the transmission of a scooter is used under high temperatures and is subjected to high pressures in the width direction while running. Therefore, the V-belt is made of chloroprene rubber, which has a relatively high heat resistance, and chopped para aramid fibers which are intermixed in the V-belt and oriented in the width direction of the V-belt so as to improve the belt's strength with respect to lateral pressure. Due to this, the durability of the transmission V-belt has been improved to a certain degree. However, if a higher pressure is applied in the width direction of the V-belt, the durability is still not sufficient.

Therefore, it has been suggested that the chopped aramid fibers which are intermixed in the belt should be longer so as to improve the orientation property and further to improve the durability of the V-belt. However, the modulus of the chopped aramid fiber is high and the dispersion property with respect to a stock rubber is bad, so it is difficult to mold the transmission belt from a stock rubber which has longer chopped aramid fibers intermixed there in. Therefore, it is not possible to obtain a transmission belt having good durability by using a stock rubber in which the longer chopped aramid fibers are intermixed.

DISCLOSURE OF INVENTION

Therefore, an object of the present invention is to provide a transmission belt that has good durability.

According to the present invention, a transmission belt has a belt body which is molded from a stock rubber, chopped aramid fibers that are intermixed in the belt body and oriented in a predetermined direction of the belt body, and chopped polyester fibers that are intermixed in the belt body and oriented in the predetermined direction. In this belt, the chopped polyester fibers are longer than the chopped aramid fibers.

Preferably the chopped aramid fibers and chopped polyester fibers are oriented in a width direction of the belt body.

Preferably 5 to 30 parts by total weight of the chopped aramid fibers and the chopped polyester fibers are intermixed in the stock rubber with respect to 100 parts of a rubber component of the stock rubber.

Preferably the length of the chopped aramid fibers is less than 3 mm and the length of the chopped polyester fibers is less than 5 mm.

The rubber component is one of ethylene propylene copolymer, ethylene propylene diene terpolymer, nitrile butadiene rubber, hydrogenated nitrile butadiene rubber, chloroprene rubber, and so on.

Preferably the chopped polyester fibers are subjected to a treatment involving coating with a resorcinol-formalin-latex. Further, the chopped polyester fiber is chopped PET (polyethylene terephthalate) fiber. Chopped Polyethylene isophthalate fiber, chopped polybutylene terephthalate fiber, chopped fiber obtained from a ring-opening polymer of β-propionelactone, or a chopped fiber of a polymer obtained by polymerizing dimethyl terephthalate and 1,4-cyclohexanedimethanol may be used as chopped polyester fiber.

Preferably, the chopped aramid fiber is one of chopped para aramid fiber and chopped meta aramid fiber.

Preferably the transmission belt is a V-belt, particularly a cogged V-belt.

According to the present invention, a transmission belt has a belt body which is obtained and molded from a stock rubber in which chopped aramid fibers and chopped polyester fibers are intermixed. In this belt, the chopped polyester fibers are longer than chopped aramid fibers and the chopped aramid fibers and the chopped polyester fibers are oriented in a predetermined direction of the belt body.

BRIEF DESCRIPTION OF DRAWINGS

The objects and advantages of the present invention will be better understood from the following description, with reference to the accompanying drawings in which.

BEST MODE FOR CARRYING OUT THE INVENTION

The present invention will be described below with reference to an embodiment shown in the drawings.

Figure 1:
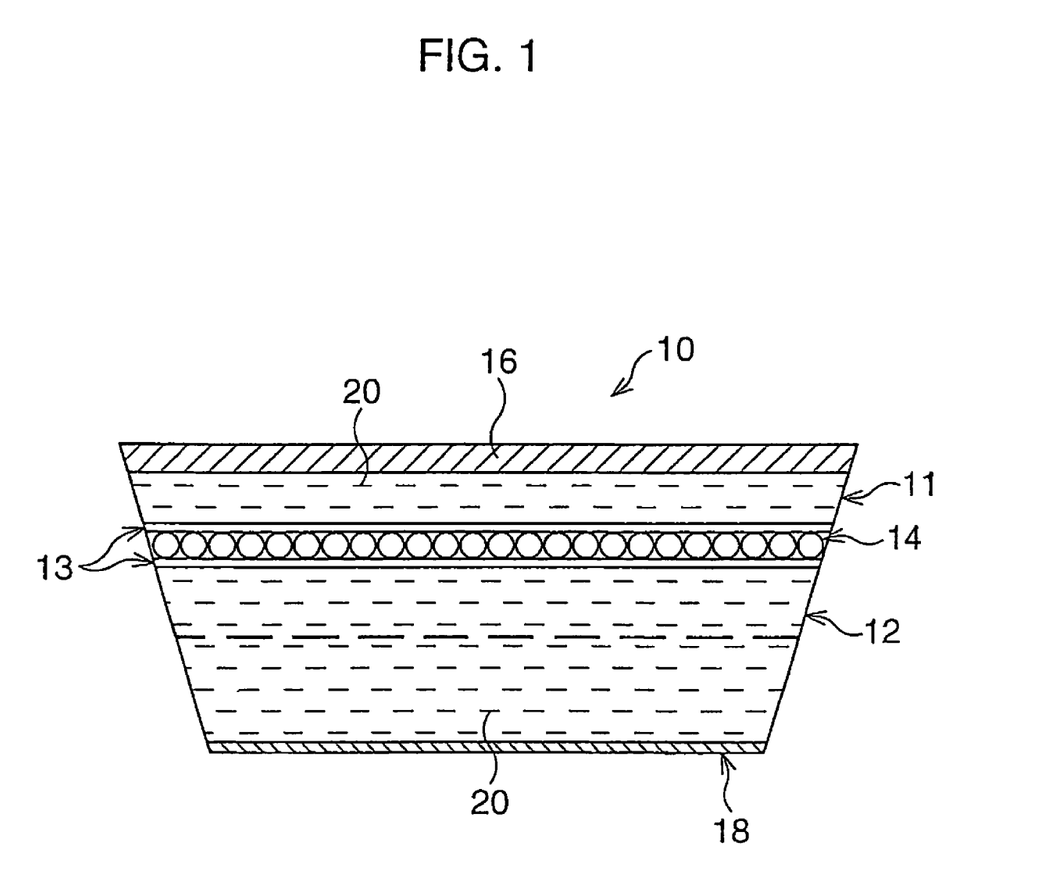
FIG. 1 is a sectional view of a V-belt in an embodiment of the invention.
Figure 2:
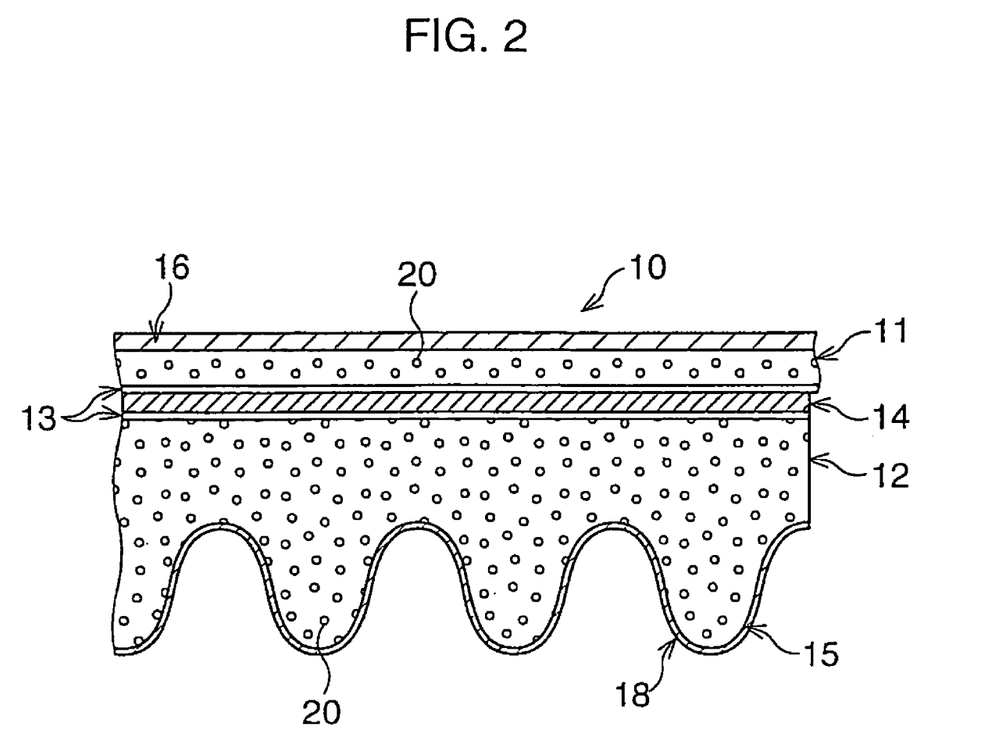
FIG. 2 is a partial side view of the V-belt shown in FIG. 1.

FIG. 1 is a sectional view of a V-belt 10 in the embodiment. FIG. 2 is a partial side view of the V-belt 10 shown in FIG. 1. A belt body of the V-belt 10 is molded from a stock rubber. The stock rubber consists of EPDM (ethylene propylene diene terpolymer) which is a rubber component, and other additional agents. The V-belt 10 has a top rubber 11 which is formed at the top side, and a bottom rubber 12 which is formed at the bottom side. A cord 14, extending in the longitudinal direction of the belt 10, is embedded between the top rubber 11 and the bottom rubber 12. Adhesive rubber layers 13 are placed in close contact with the top and bottom surface of the cord 14. The top surface of the top rubber 11 is covered with a facing fabric 16. The bottom rubber 12 is provided with cogs 15 formed in wave shapes in the longitudinal direction. The bottom surface of the bottom rubber 12 is covered with a cogged fabric 18. The top rubber 11 and the bottom rubber 12 are provided with chopped fibers 20 oriented in the width direction. The chopped fibers 20 are chopped aramid fibers and chopped polyester fibers. The chopped polyester fibers are longer than the chopped aramid fibers.

The top rubber 11 and the bottom rubber 12 of the V-belt 10 are obtained and molded from a stock rubber sheet by vulcanizing. The stock rubber sheet has chopped fibers which are intermixed and oriented in a predetermined direction beforehand. The stock rubber sheet is produced by kneading a stock rubber which has the chopped fibers intermixed, and then rolling the stock rubber with a roller or calendar. At this time, the chopped fibers 20 are oriented in the rolling direction.

The longer the chopped fibers 20, the worse the dispersion properties with respect to the stock rubber, and hence the worse the processability. Therefore, preferably the length of the chopped aramid fibers is from about 1 to 3 mm.

However if only chopped aramid fibers with a length of about 1 to 3 mm are intermixed in the stock rubber sheet, the chopped fibers are so short that not all of them can be oriented in the rolling direction during rolling.

On the other hand, because the modulus of the chopped polyester fiber is lower than that of the chopped aramid fiber and if the longer chopped polyester fibers are intermixed, the dispersion properties don't become worse. And further, the longer the chopped fibers that are intermixed, the higher the proportion of the chopped fibers oriented in the rolling direction. Therefore, a V-belt having almost all the chopped polyester fibers oriented in a predetermined direction can be obtained, if the longer chopped polyester fibers are used. However the strength of the chopped polyester fiber is lower than that of the chopped aramid fiber, so the durability is not greatly improved if only chopped polyester fibers are intermixed.

Therefore, the chopped aramid fibers and the chopped polyester fibers, which are longer than the chopped aramid fibers, are intermixed in the stock rubber in this embodiment. In this case, almost all the chopped polyester fibers are oriented in the rolling direction, making almost all the chopped aramid fibers oriented in the rolling direction. Due to this, the proportion of the chopped fibers oriented in rolling direction is higher than when only chopped aramid fibers are intermixed.

The length of the chopped aramid fiber should be less than about 3 mm, preferably about 1 to 3 mm, and more preferably about 1 mm. The lengths of the chopped polyester fiber should be less than about 5 mm, preferably about 1 to 5 mm, and more preferably about 3 mm.

In this embodiment, the stock rubber is provided with 5 to 30 parts by total weight of the chopped fibers 20 (the chopped aramid fibers and the chopped polyester fibers) with respect to 100 parts by weight of EPDM as the rubber component. More specifically in this case, the stock rubber should be provided with about 5 to 15 parts by weight of the chopped aramid fibers, more preferably about 10 parts by weight; and about 5 to 15 parts by weight of the chopped polyester fibers, more preferably about 10 parts by weight, with respect to 100 parts by weight of EPDM as the rubber component.

It is also possible to use ethylene propylene copolymer (EPM), nitrile butadiene rubber (NBR), hydrogenated nitrile butadiene rubber (H-NBR), chloroprene rubber (CR), or another rubber as the rubber component instead of ethylene propylene diene terpolymer (EPDM).

Chopped meta aramid fibers which are less expensive than chopped para aramid fibers are preferable. But when a transmission belt with higher durability is required, the chopped para aramid fibers having higher strength than chopped meta aramid fibers are preferable.

The chopped polyester fiber is preferably a chopped PET (polyethylene terephthalate) fiber, but it may also be a chopped polyethylene isophthalate fiber, a chopped polybutylene terephthalate fiber, a chopped fiber obtained from a ring-opening polymer of β-propionelactone, a chopped fiber of a polymer obtained by polymerizing dimethyl terephthalate and 1,4-cyclohexanedimethanol, or another chopped fiber.

The chopped polyester fibers are subjected to a treatment involving coating with a resorcinol-formalin-latex (RFL). For example, the chopped polyester fibers are formed by dipping long fibers in an RFL solution, drying them, and then cutting them to predetermined lengths.

EXAMPLES

Example Rubbers and Comparative Rubbers

The present invention will be explained with reference to examples of the invention as well as comparative examples. Note that the present invention is not limited in any way by these examples.

The following Table 1 shows the composition of the chopped fibers of Examples A to H and the Comparative Examples 1 and 2.

TABLE 1

|  |  | Examples |  |  |  |  |  |  |  | Comp. |  |
|---|---|---|---|---|---|---|---|---|---|---|---|
|  |  | A | B | C | D | E | F | G | H | 1 | 2 |
| Aramid | Length (mm) | 1 | 1 | 1 | 1 | 1 | 2 | 2 | 3 | 1 | 3 |
|  | *Weight | 10 | 5 | 15 | 5 | 15 | 10 | 10 | 10 | 10 | 10 |
| Polyester | Length (mm) | 3 | 3 | 3 | 3 | 3 | 3 | 5 | 5 | 1 | 3 |
|  | *Weight | 10 | 15 | 5 | 5 | 15 | 10 | 10 | 10 | 10 | 10 |

*Weight: parts by weight of each chopped fibers blended in the stock rubber with respect to 100 parts of EPDM The rubber of Example A is comprised of 60 parts by weight of carbon black, 14.7 parts by weight of an organic metal salt, 1 part by weight of an antioxidant agent, 0.3 parts by weight of a scorch retarder, 8.7 parts by weight of paraffin oil, 5 parts by weight of a vulcanizing agent, 10 parts by weight of chopped meta aramid fibers having a length of 1 mm and a diameter of 14.32 μm (trade name "Conex", made by Teijin) and 10 parts by weight of chopped PET fibers having a length of 3 mm and a diameter of 23.8 μm, blended into 100 parts by weight of EPDM (trade name "Keltan 2340A", made by DSM) having a Mooney viscosity at 100° C. of 25.

The rubber of the Examples B to E has the same composition as that of the rubber of Example A except for the parts by weight of the chopped aramid fibers and chopped polyester fibers, with respect to the 100 parts of the rubber component. The rubber of Example B has 5 parts by weight of the chopped aramid fibers and 15 parts by weight of the chopped polyester fibers with respect to the 100 parts of the rubber component. The rubber of Example C has 15 parts by weight of the chopped aramid fibers and 5 parts by weight of the chopped polyester fibers with respect to the 100 parts of the rubber component. Namely, the combined parts by weight of the chopped fibers of examples B and C are the same as that in Example A.

The rubber of Example D has 5 parts by weight of the chopped aramid fibers and 5 parts by weight of chopped polyester fibers with respect to 100 parts of the rubber component. The rubber of Example E has 15 parts by weight of chopped aramid fibers and 15 parts by weight of chopped polyester fibers with respect to 100 parts of the rubber component. Namely, the combined parts by weight of the chopped fibers of examples D and E are changed from that in Example A.

The rubber of the examples F to H has same composition as that of the rubber of Example A except for the lengths of chopped aramid fibers and chopped polyester fibers. The rubber of Example F has chopped aramid fibers with a length of 2 mm and chopped polyester fibers with a length of 3 mm. The rubber of Example G has chopped aramid fibers with a length of 2 mm and chopped polyester fibers with a length of 5 mm. The rubber of Example H has chopped aramid fibers with a length of 3 mm and chopped polyester fibers with a length of 5 mm. Each part by weight of the chopped aramid fibers and chopped polyester fibers of examples F to H is the same as that in Example A.

The rubber of comparative examples 1 and 2 has the same composition as that of the rubber of Example A except that the length of the chopped aramid fibers is the same length as that of the chopped polyester fibers. The rubber of comparative example 1 has chopped aramid fibers with a length of 1 mm and chopped polyester fibers with a length of 1 mm. The rubber of the comparative example 2 has chopped aramid fibers with a length of 3 mm and chopped polyester fibers with a length of 3 mm.

The rubbers of examples A to H and comparative examples 1 and 2 were evaluated by using the first compression stress test. The compression ratio (%) was measured when a stress was applied. The test results are shown in tables 2 to 4. The test pieces were cylindrical pieces of rubber having lengths of 12.5 mm and diameters of 29.0 mm. The direction of the compression was the same as the direction of orientation of the chopped fibers.

TABLE 2

| Example A | | Example B | | Example C | | Comp. 1 | | Comp. 2 | |
| --- | --- | --- | --- | --- | --- | --- | --- | --- | --- |
| %* | S** | %* | S** | %* | S** | %* | S** | %* | S** |
| 1.0 | 0.2 | 1.0 | 0.1 | 1.0 | 0.1 | 1.0 | 0.1 | 1.0 | 0.2 |
| 3.0 | 0.1 | 3.0 | 0.1 | 3.0 | 0.1 | 3.0 | 0.1 | 3.0 | 0.1 |
| 5.0 | 1.1 | 5.0 | 1.1 | 5.0 | 1.1 | 5.0 | 1.2 | 5.0 | 1.2 |
| 6.8 | 2.0 | 7.0 | 2.2 | 7.0 | 1.9 | 7.0 | 2.0 | 7.5 | 2.1 |

%*: compression ratio (%)
S**: stress (N/mm²)

TABLE 3

| Example D | | Example E | | Comp. 1 | | Comp. 2 | |
| --- | --- | --- | --- | --- | --- | --- | --- |
| %* | S** | %* | S** | %* | S** | %* | S** |
| 1.0 | 0.1 | 1.0 | 0.1 | 1.0 | 0.1 | 1.0 | 0.2 |
| 3.0 | 0.1 | 3.0 | 0.1 | 3.0 | 0.1 | 3.0 | 0.1 |
| 5.0 | 1.3 | 5.0 | 1.1 | 5.0 | 1.2 | 5.0 | 1.2 |
| 8.3 | 2.1 | 7.1 | 2.1 | 7.0 | 2.0 | 7.5 | 2.1 |

%*: compression ratio (%)
S**: stress (N/mm²)

TABLE 4

| Example F | | Example G | | Example H | | Comp. 1 | | Comp. 2 | |
| --- | --- | --- | --- | --- | --- | --- | --- | --- | --- |
| %* | S** | %* | S** | %* | S** | %* | S** | %* | S** |
| 1.0 | 0.1 | 1.0 | 0.1 | 1.0 | 0.2 | 1.0 | 0.1 | 1.0 | 0.2 |
| 3.0 | 0.1 | 3.0 | 0.1 | 3.0 | 0.1 | 3.0 | 0.1 | 3.0 | 0.1 |

TABLE 4-continued

| Example F | | Example G | | Example H | | Comp. 1 | | Comp. 2 | |
| --- | --- | --- | --- | --- | --- | --- | --- | --- | --- |
| %* | S** | %* | S** | %* | S** | %* | S** | %* | S** |
| 5.0 | 1.1 | 5.0 | 1.1 | 5.0 | 1.2 | 5.0 | 1.2 | 5.0 | 1.2 |
| 7.2 | 2.0 | 6.8 | 2.0 | 7.1 | 2.0 | 7.0 | 2.0 | 7.5 | 2.1 |

%*: compression ratio (%)
S**: stress (N/mm²)

As shown in tables 2 to 4, the results of examples A to H were the same results as those for the comparative examples 1 and 2 in the first compression stress test.

Figure 3:
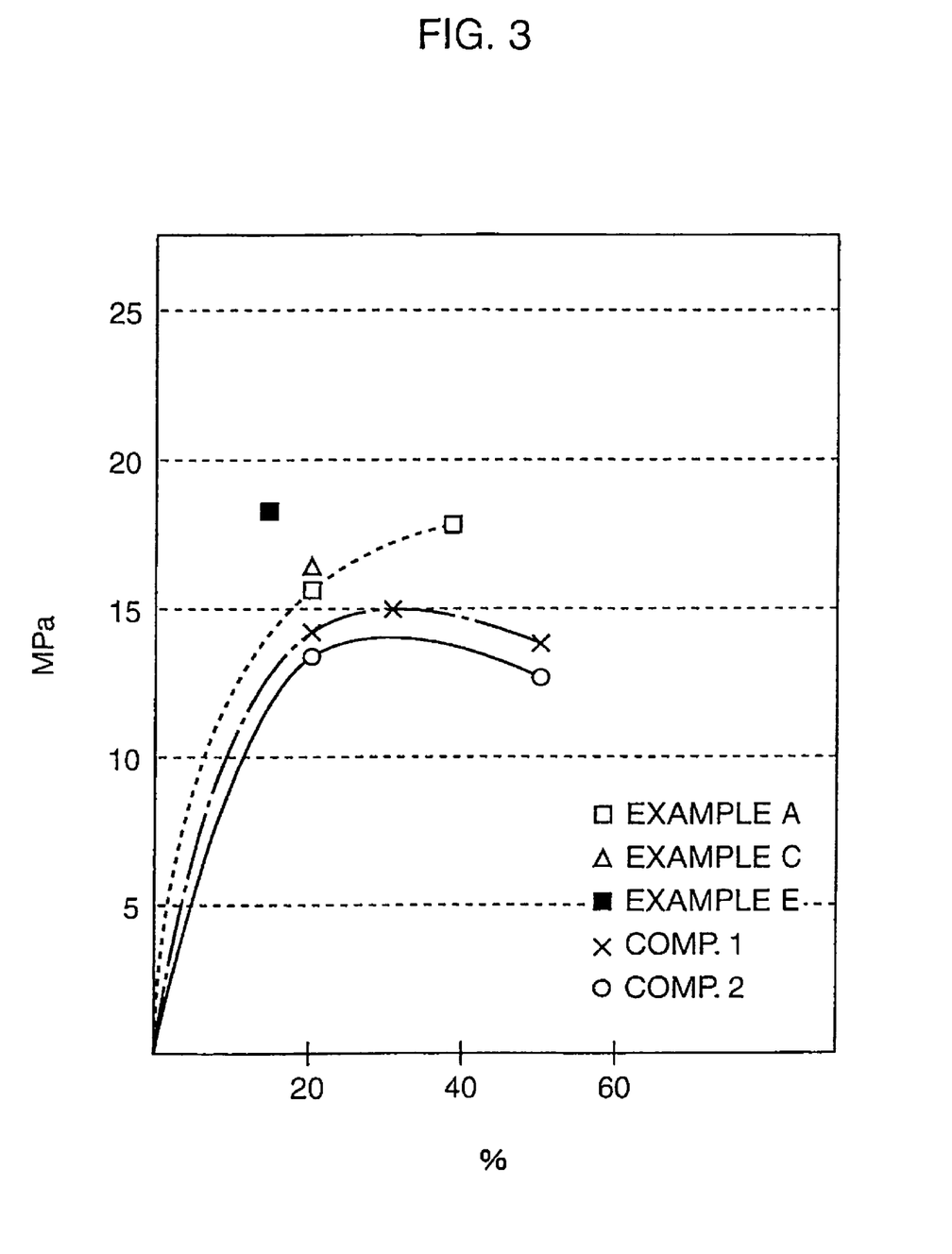
FIG. 3 is a graph of the results of a tensile strength test.

The rubbers of the examples A, C and E and comparative examples 1 and 2 were evaluated by using a tensile strength test. The elongation ratio (%) was measured when a tension (MPa) was applied. The test results are shown in FIG. 3. The test pieces were obtained by cutting down a rubber shape using number 5 type dumbbells of JIS K6251. The direction of the tension was the same as the direction of the orientation of the chopped fibers.

As shown in FIG. 3, the elongation ratio of examples A, C, and E was less than that of the comparative examples 1 and 2, namely the strengths against tension in examples A, C, and E were superior to comparative examples 1 and 2, because the orientation of the chopped fibers was improved when the chopped polyester fibers, being longer than the chopped aramid fibers, were blended in the stock rubber.

Figure 4:
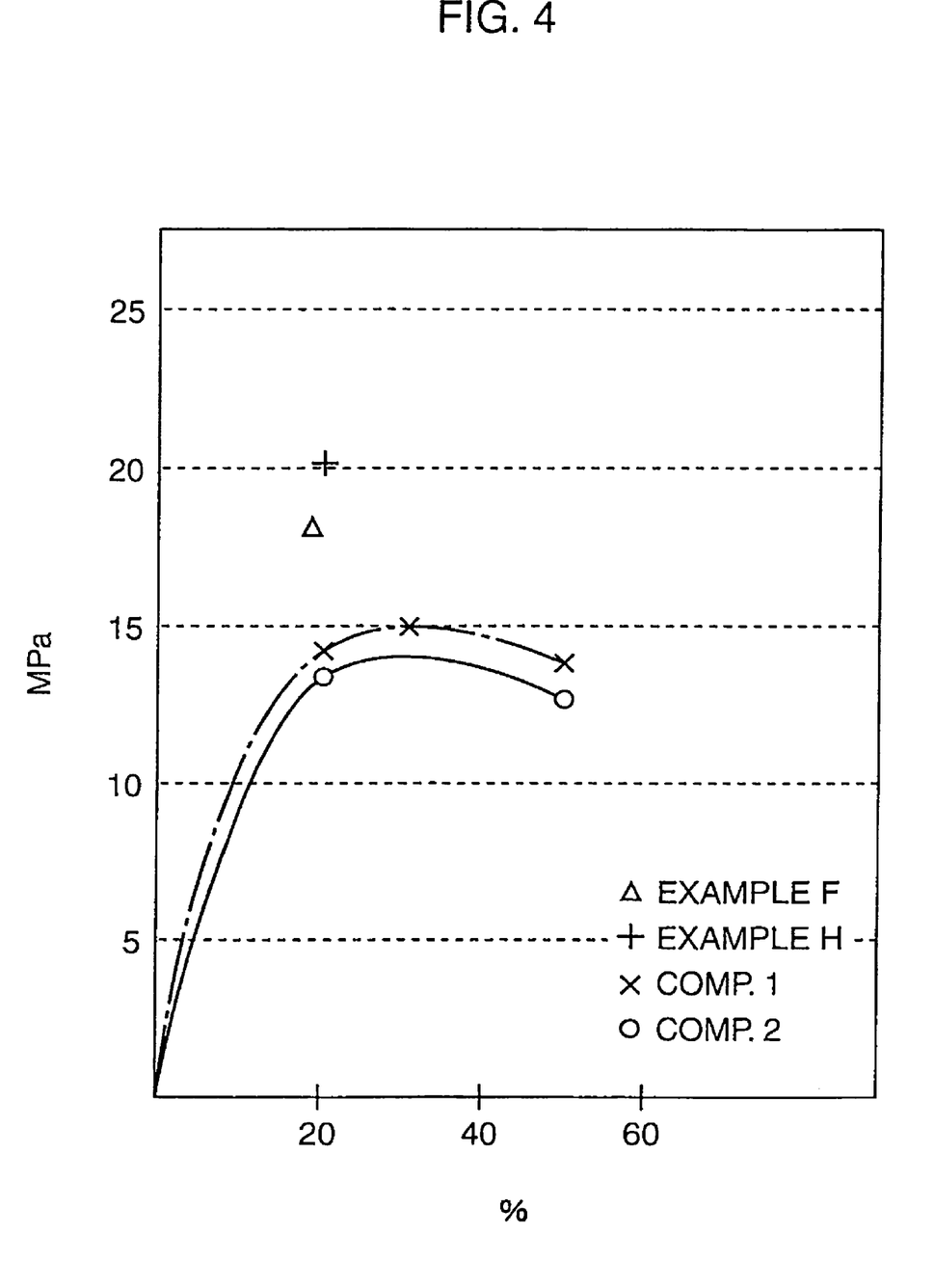
FIG. 4 is a graph of the results of a tensile strength test.

The rubbers of examples F and H and comparative examples 1 and 2 were evaluated by using a tensile strength test. The test results are shown in FIG. 4. As shown in FIG. 4, the strengths against tension in examples F and H were superior to that of the comparative examples 1 and 2, and were the similar to the results for examples A, C, and E.

As above described, the strength of the stock rubber was improved by blending the chopped aramid fibers and the chopped polyester fibers, being longer than the chopped aramid fibers, in the stock rubber.

Example Rubber and Conventional Rubber

Figure 13:
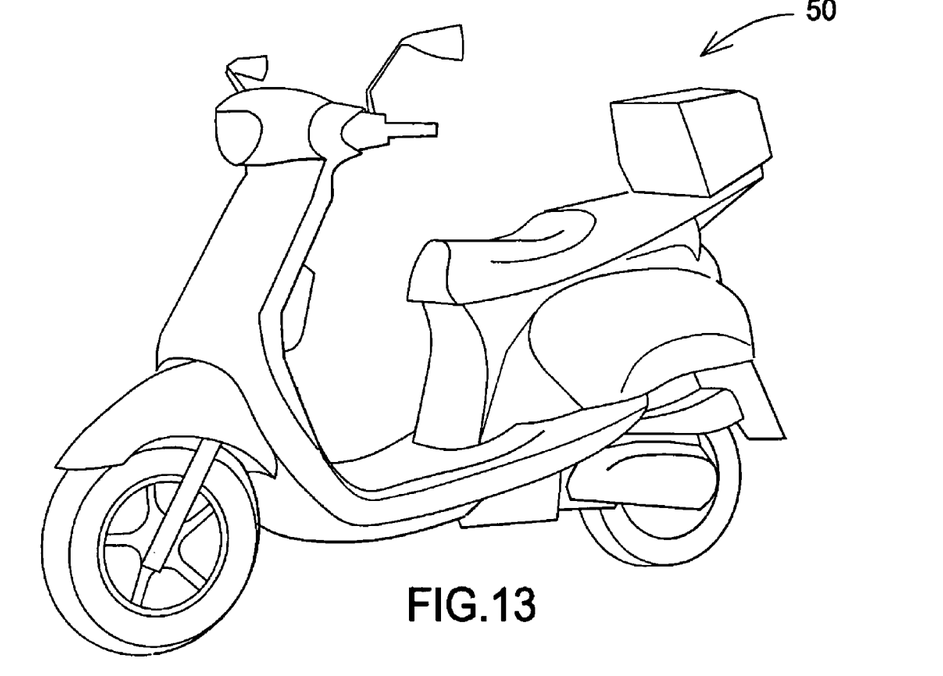
FIG. 13 is a perspective view of a motor scooter 50 employing a conventional transmission, utilizing a belt in accordance with the invention.
Figure 14:
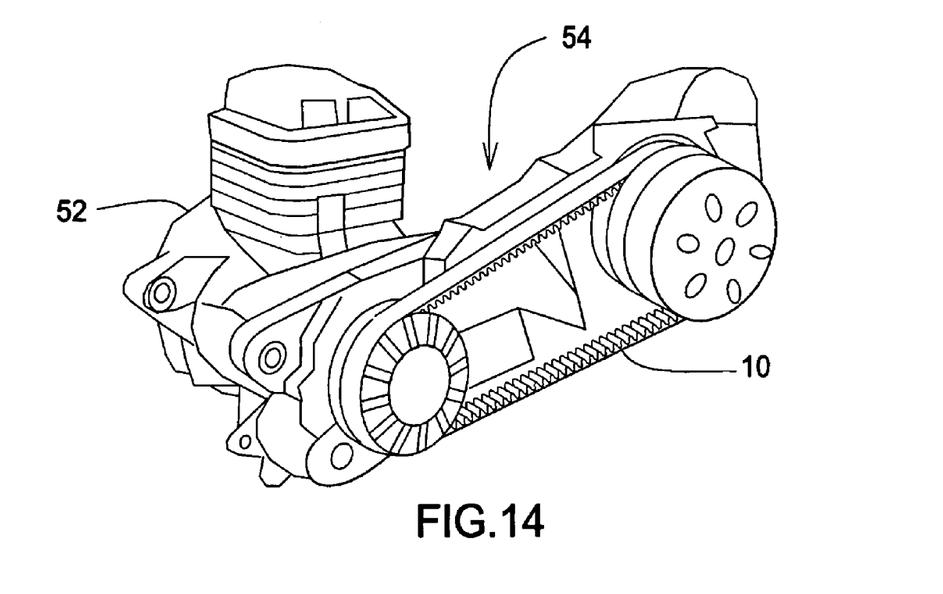
FIG. 14 is a perspective partial cutaway view of transmission 54 for the scooter of FIG. 13, which transmits power from engine 52 to the rear wheel of the scooter, utilizing driver and driven pulleys and cogged V-belt 10 of the invention interconnecting the pulleys.

Next, the test results for Example A and the conventional example will be explained. The rubber of the conventional example is conventionally used for a V-belt of a scooter 50 as shown in FIG. 13. The rubber of the conventional example was comprised of 56 parts by weight of carbon black, 3.4 parts by weight of magnesium oxide, 4 parts by weight of an antioxidant agent, 7 parts by weight of a vulcanizing agent, 12.6 parts by weight of chopped aramid fibers (trade name "Kevlar", made by Du Pont, and 8.4 parts by weight of chopped para aramid fiber having a length of 1 mm and a diameter of 12.35 Lim (trade name "Technora", made by Teijin) blended into 100 parts by weight of chloroprene rubber.

Figure 5:
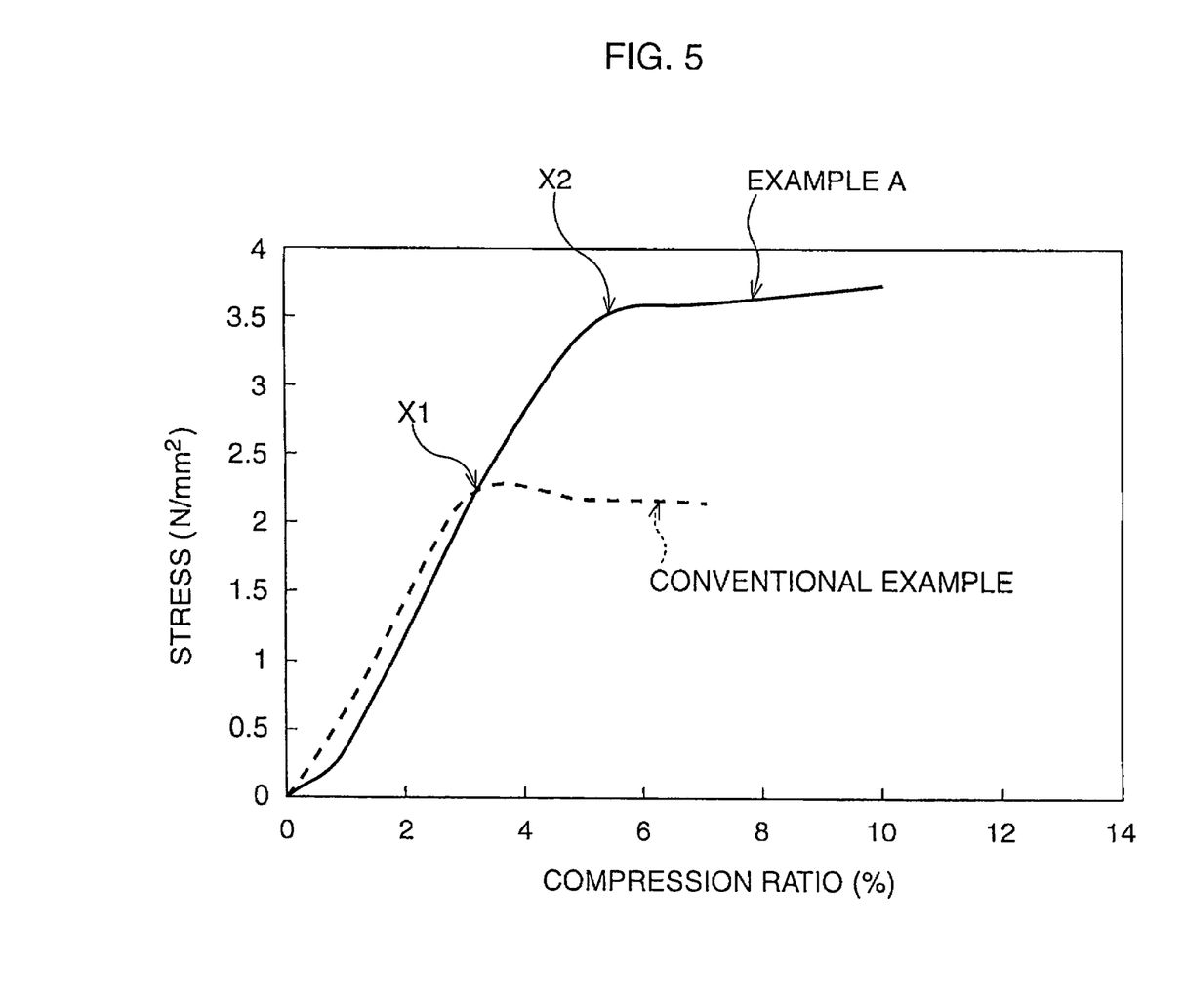
FIG. 5 is a graph of the results of a compression stress test.

The rubbers of Example A and the conventional example were evaluated by using a second compression stress test. The compression ratio (%) was measured when a stress was applied. The test results are shown in FIG. 5. The test pieces were cylindrical pieces of rubber having lengths of 25.4 mm and diameters of 17.8 mm. The direction of compression was the same as the direction of orientation of the chopped fiber.

As shown in FIG. 5, the compression ratios of the rubber of Example A and the conventional example, increased in proportion to the stresses until the stresses reached predetermined values. When the stress exceeded the predetermined values, the test pieces buckled and the compression ratios rapidly increased. This was caused by the bending of the chopped fiber intermixed, when the stresses reached the buckling points X1 and X2.

The increase of the compression ratio of the rubber degrades the rubber. Namely, the higher the stress required to reach the buckling points X1 and X2, the higher the strength of the rubber. As shown by this test, that of the rubber of Example A has higher strength than that of the conventional example.

Figure 6:
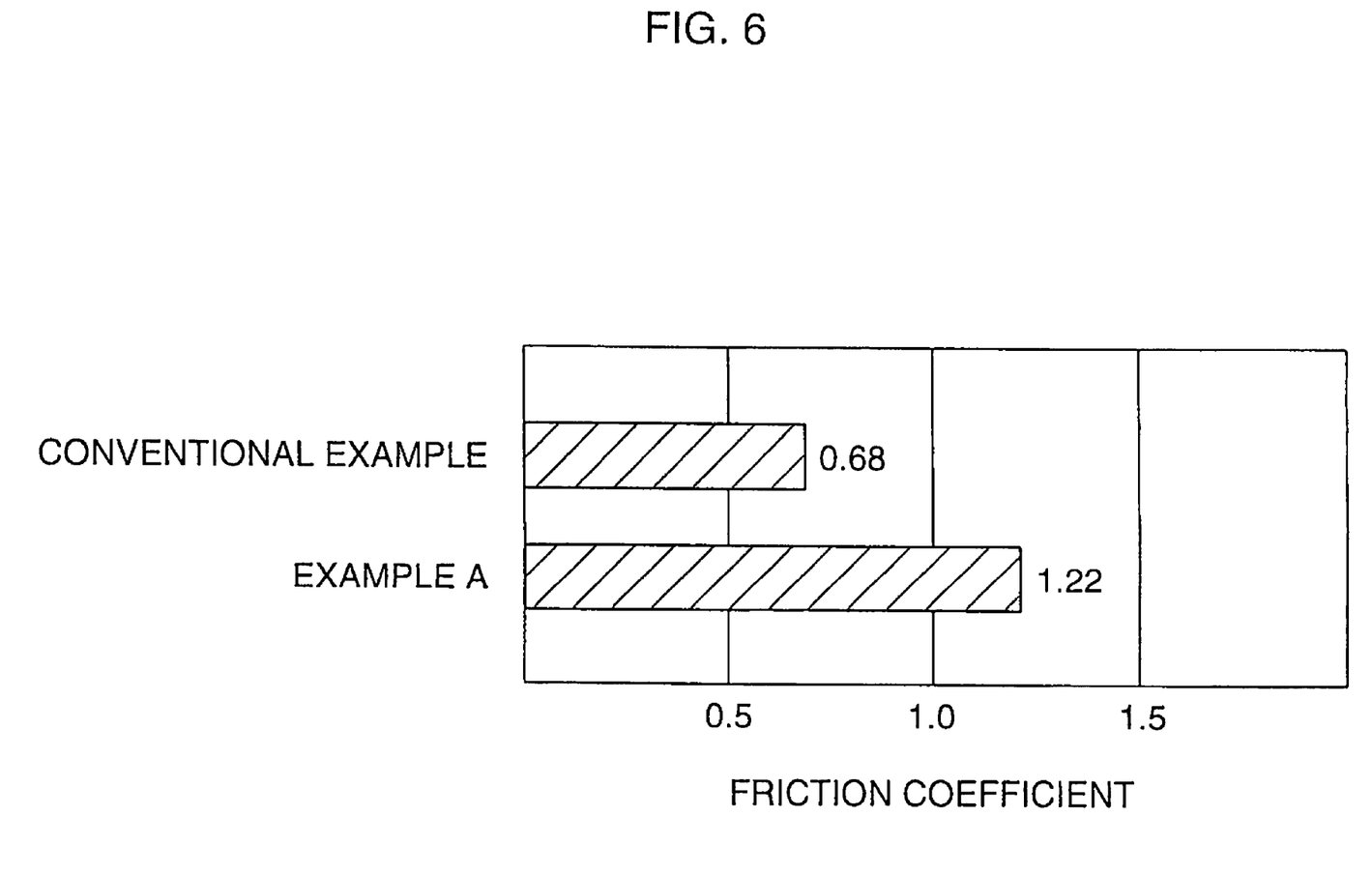
FIG. 6 is a graph of the results of the measurement of the friction coefficient.
Figure 7:
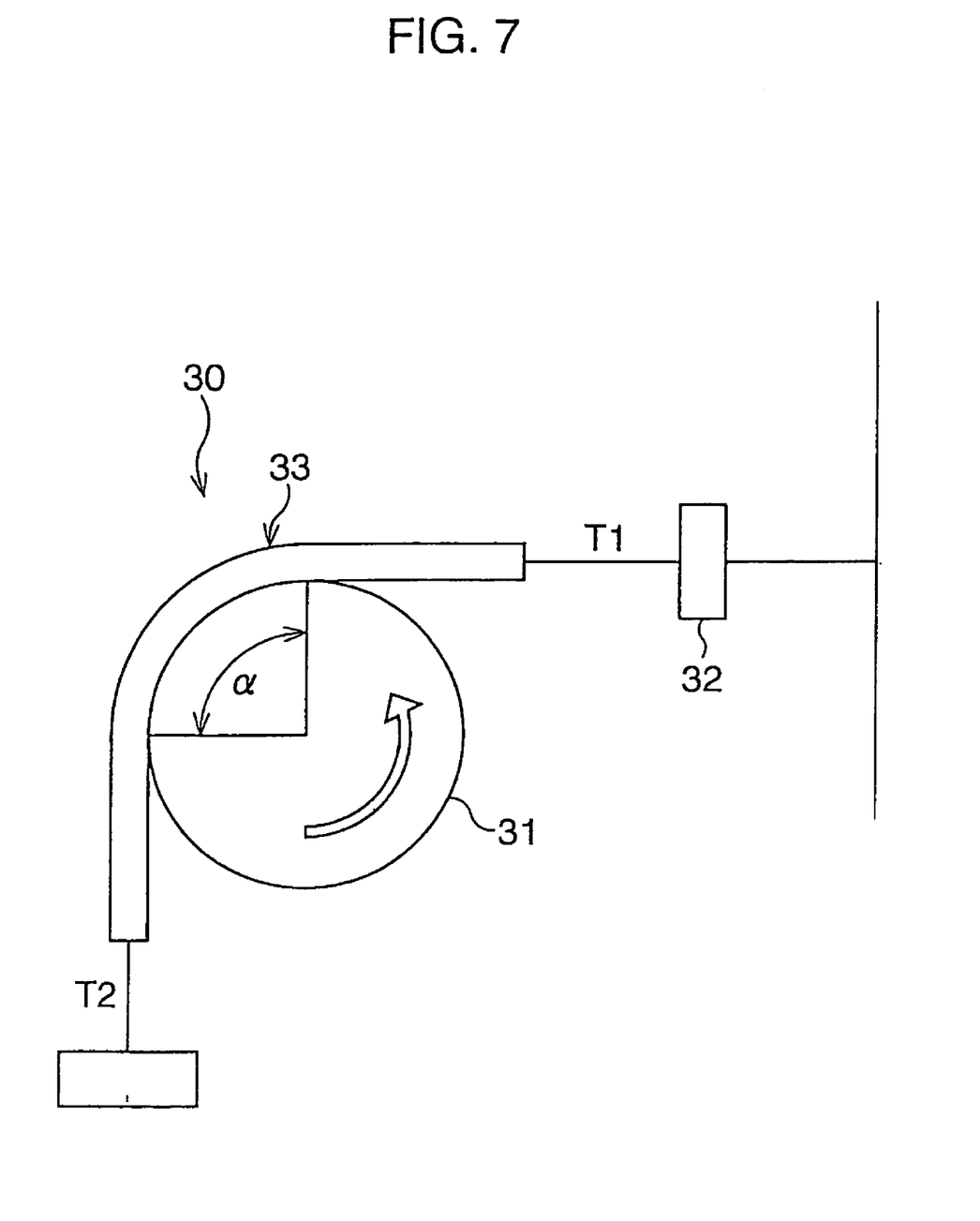
FIG. 7 is a schematic view of a friction coefficient measurement apparatus.

Further, the friction coefficients of the V-belts which were molded from the stock rubbers of Example A and the conventional example were measured. FIG. 6 shows the result. The chopped fibers were oriented in the width direction. The friction coefficient was measured by a friction coefficient measurement apparatus 30, such as that shown in FIG. 7. The pulley 31 had a diameter of 80 mm, and the contact angle ($\alpha$) between the pulley 31 and the V-belt 33 was 90 degrees ($\pi/2$). The tension (T1) in the horizontal direction was measured by a measuring device 32, when the speed of the pulley 31 was 42 rpm and the tension (T2) in the vertical direction acting on the V-belt 33 was 17.2 N. The friction coefficient ($\mu$) of the V-belt 33 was calculated by applying the tension (T1) in formula (1).

$$\mu = \{ln(T1/T2)\}/\alpha \quad (1)$$

As shown in FIG. 6, the friction coefficient ($\mu$) was 0.68 for the conventional V-belt and 1.22 for the Example A V-belt. A suitable friction coefficient in the transmission of a scooter has been found empirically, to be around 1.2. The Example A V-belt can be said to have a more suitable friction coefficient than the conventional V-belt. Namely, the Example A V-belt was improved in power transmission performance compared with the conventional V-belt.

Figure 8:
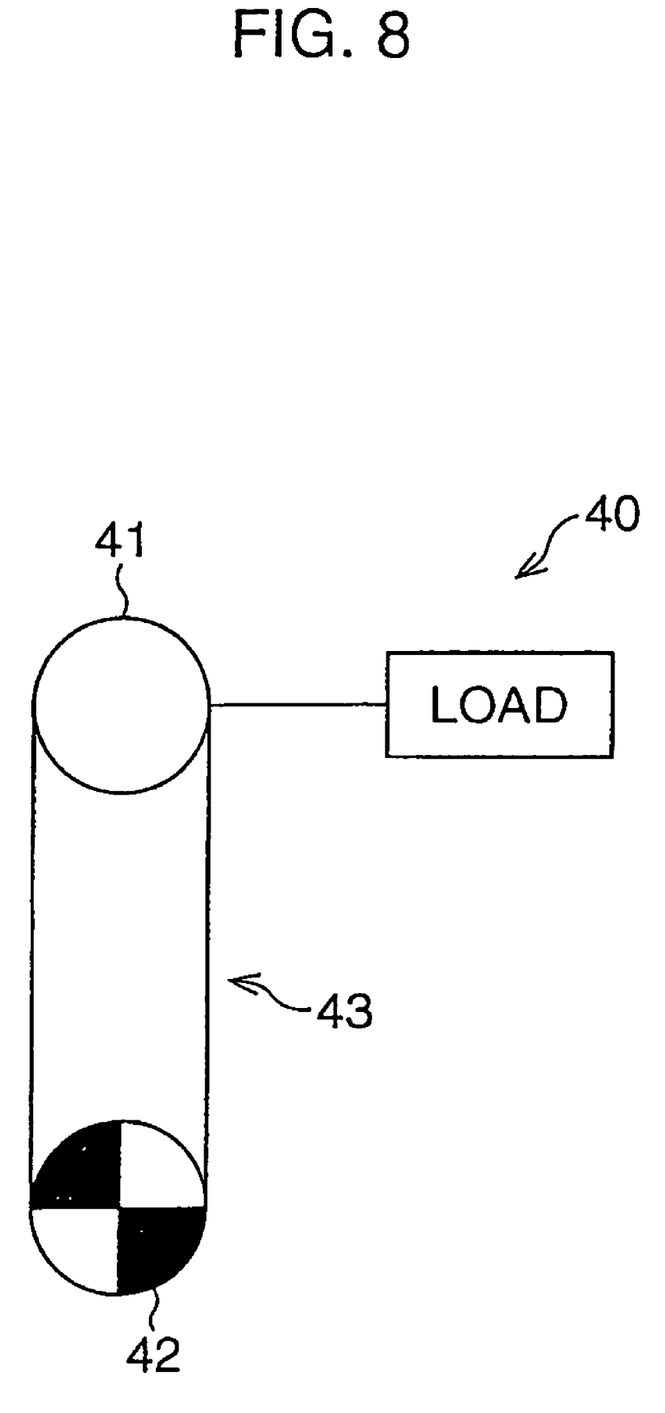
FIG. 8 is a schematic view of the durability test apparatus.

A durability test was performed using the durability test apparatus 40 shown in FIG. 8. A V-belt 43 was molded in to an endless shape having a pitch length at the zone where the cord was embedded of 760 mm, a width of the top surface of the V-belt of 18 mm, and a height from the back surface to the tops of the cogs of 9 mm. The V-belt 43 was hung on a drive pulley 42 and a driven pulley 41. The initial tension was 500N. The drive pulley 42 was rotated at a speed of 5000 rpm by a load of 10 Nm in an atmosphere of 100° C. The drive pulley 42 and the driven pulley 41 were V-pulleys, 100-mm outside diameters, and 30-degrees V-groove angles.

Figure 9:
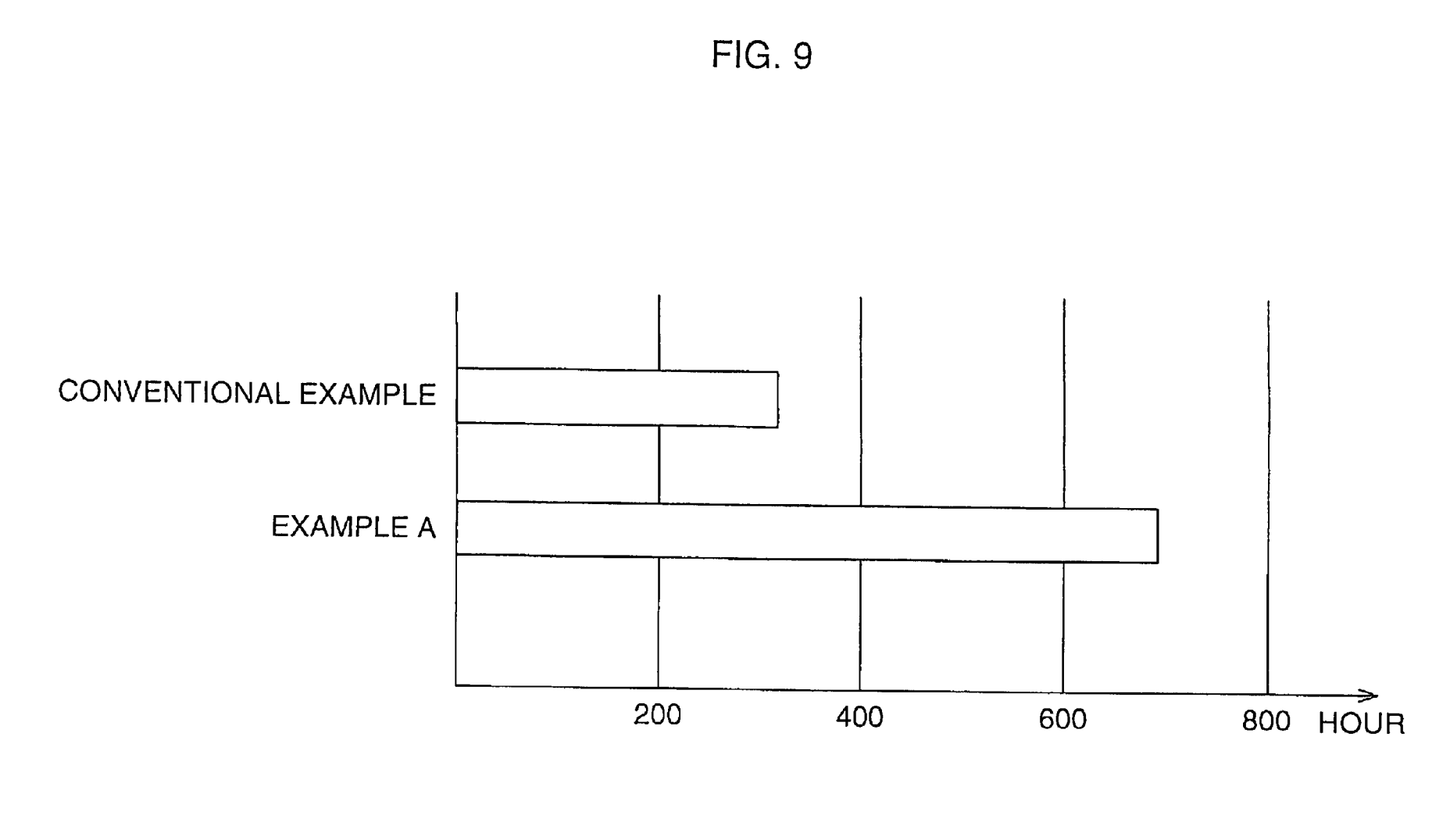
FIG. 9 is a graph of the results of a durability test.

FIG. 9 shows the results of the durability test. The durability time was the time until the V-belt 43 could no longer run. For the conventional example, the bottom rubber broke and the V-belt could not run after about 320 hours. On the other hand, for Example A, the V-belt broke and could not run after about 680 hours. Namely, this durability test showed that the Example A V-belt had better durability compared with the conventional V-belt.

Figure 10:
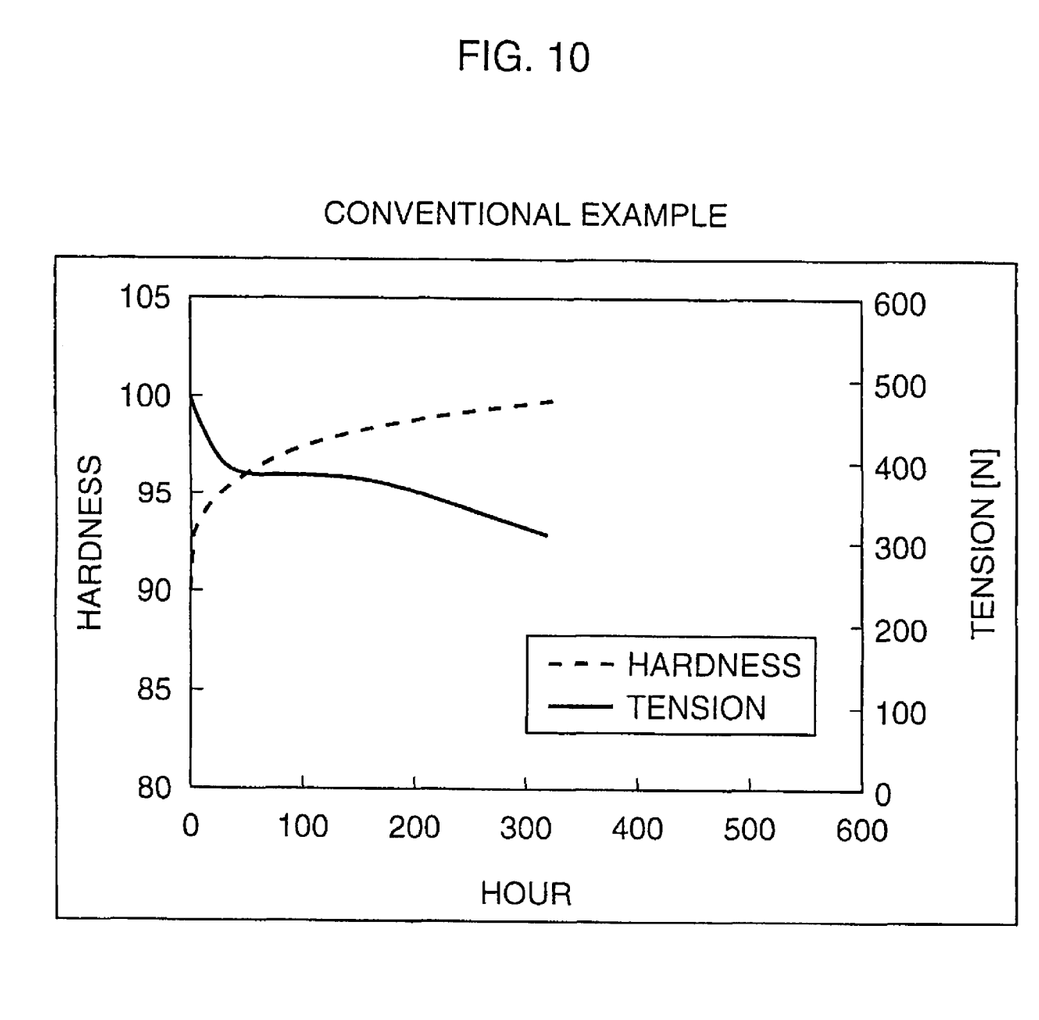
FIG. 10 is a graph of the changes in hardness and tension of a Conventional V-belt in the durability test.
Figure 11:
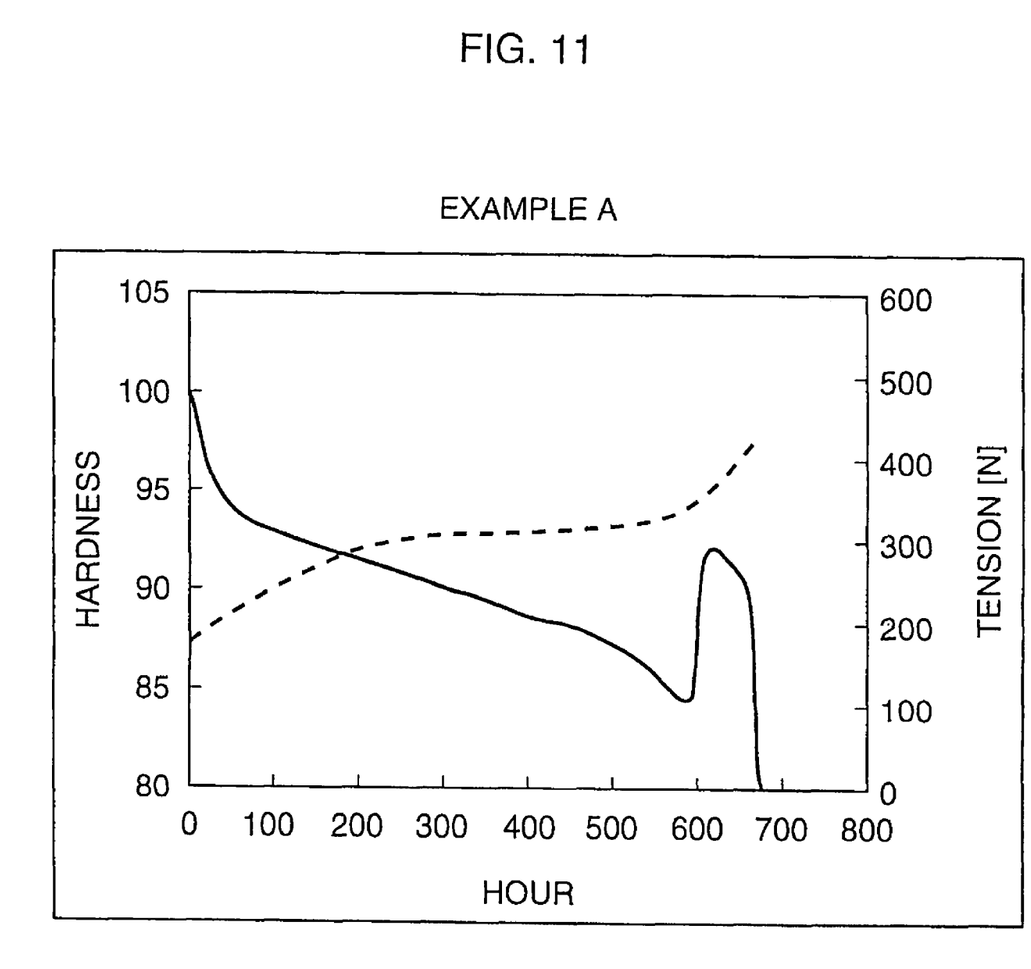
FIG. 11 is a graph of the changes in hardness and tension of a V-belt of the present invention in the durability test.

FIGS. 10 and 11 show the changes in the hardness and installation tension of the Example A V-belt and conventional V-belt during the durability test. For both the Example A and conventional V-belts, the hardness went up and the tension decayed in accordance with the elapsed time. Further, the tension of the Example A V-belt rapidly recovered at 600 hours due to the restringing of the V-belt.

Figure 12:
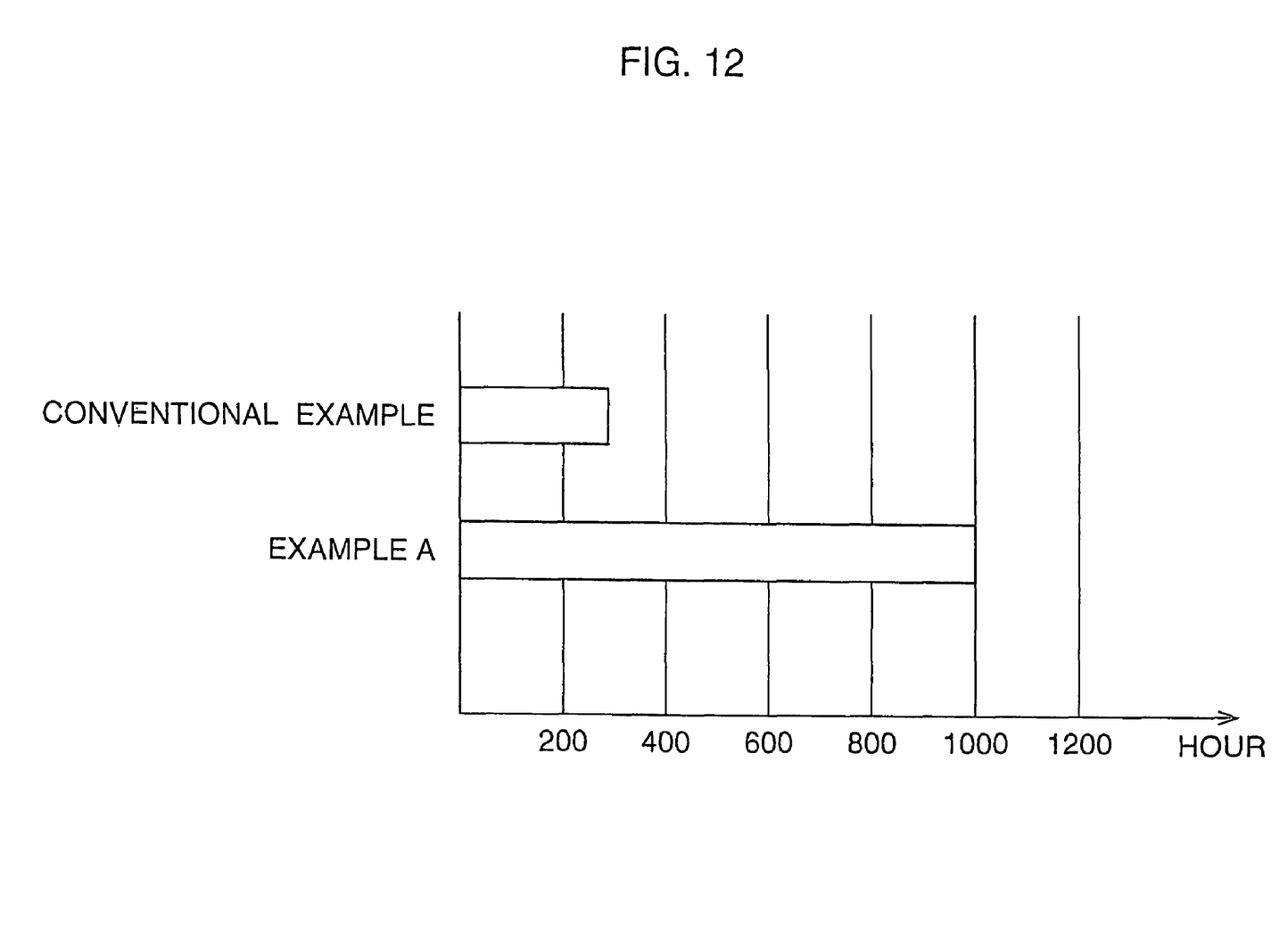
FIG. 12 is a graph of the results of a heat resistance test.

FIG. 12 shows the time until the V-belt could no longer rotate in a heat resistance test. The heat resistance test was performed in an atmosphere of 120° C. The Example A V-belt and the conventional V-belt were hang between two flat pulleys having the same pulley diameters (77 mm), and rotated. The pulley speed was set to 6000 rpm and the initial installation tension to 150N. In this test, the V-belts were turned out and hung on the pulleys so that the inside rubber surface become the outside rubber surface.

As shown in FIG. 12, the conventional V-belt broke at the cogs after about 290 hours, while the Example A V-belt was cracked at the cogs after about 1000 hours. Namely, this test shows that the Example A V-belt has superior heat resistance to that of the conventional V-belt because the rubber component is EPDM.

Although the embodiments of the present invention have been described herein with reference to the accompanying drawings, obviously many modifications and changes may be made by those skilled in this art without departing from the scope of the invention.

INDUSTRIAL APPLICABILITY

In this way, the transmission belt of the present invention can be used for transmitting rotational force in almost all industrial fields, and especially it can be used for transmitting rotational force in a transmission of a scooter etc.

The invention claimed is:

1. A transmission belt comprising:
   a belt body which is molded from a stock rubber;
   chopped aramid fibers that are intermixed in said belt body and oriented in a predetermined direction of said belt body; and
   chopped polyester fibers that are intermixed in said belt body and oriented in said predetermined direction;
   wherein chopped polyester fibers are longer than said chopped aramid fibers; and
   wherein said chopped aramid fibers and said chopped polyester fibers are oriented in a width direction of said belt body.

2. A transmission belt according to claim 1, wherein 5 to 30 parts by total weight of said chopped aramid fibers and said chopped polyester fibers are intermixed in said stock rubber with respect to 100 parts of a rubber component of said stock rubber.

3. A transmission belt according to claim 1, wherein a length of said chopped aramid fibers is less than 3 mm.

4. A transmission belt according to claim 1, wherein a length of said chopped polyester fibers is less than 5 mm.

5. A transmission belt according to claim 1, wherein a rubber component of said stock rubber is one of ethylene propylene copolymer, ethylene propylene diene terpolymer, nitrile butadiene rubber, hydrogenated nitrile butadiene rubber, and chloroprene rubber.

6. A transmission belt according to claim 1, wherein said chopped polyester fibers are subjected to a treatment involving coating with a resorcinol-formalin-latex.

7. A transmission belt according to claim 1, wherein said chopped polyester fiber is one of chopped PET fiber, chopped polyethylene isophthalate fiber, chopped polybutylene terephthalate fiber, chopped fiber obtained from a ring-opening polymer of β-propionelactone, and chopped fiber of a polymer obtained by polymerizing dimethyl terephthalate and 1,4-cyclohexanedimethanol.

8. A transmission belt according to claim 1, wherein said chopped aramid fiber is one of chopped para aramid fiber and chopped meta aramid fibers.

9. A transmission belt according to claim 1, wherein said transmission belt is a V-belt.

10. A transmission belt according to claim 9, wherein said V-belt is a cogged V-belt.

11. A power transmission belt of the single strand cogged V-belt type comprising:
   (a) a belt body molded from a stock rubber, comprising a top rubber layer, a bottom rubber layer, and a cord extending in the longitudinal direction of the belt embedded between the top rubber layer and the bottom rubber layer, said bottom rubber layer being provided with cogs formed in wave shapes in the longitudinal direction of the belt;

(b) chopped aramid fibers that are intermixed in said belt body in both of said top rubber layer and said bottom rubber layer and oriented in a predetermined direction of said belt body;

(c) chopped polyester fibers that are intermixed in said belt body in both of said top rubber layer and bottom rubber layer and oriented in said predetermined direction;

(d) wherein said chopped polyester fibers have a length which is longer than said chopped aramid fibers.

12. The power transmission belt of claim 11 wherein a length of said chopped aramid fibers is less than 3 mm; wherein a length of said polyester fibers is less than 5 mm; wherein the orientation of both of said chopped aramid fibers and said chopped polyester fibers is transverse to the running direction of the belt; and wherein 5 to 30 parts by total weight of said chopped aramid fibers and said chopped polyester fibers are intermixed in said stock rubber per 100 parts rubber.

13. The power transmission belt of claim 11 in which the stock rubber is formed of EPDM, in which an organic metal salt is mixed, and the belt is used in the transmission of a scooter.

* * * * *